Dec. 24, 1963

W. J. BOWAN ETAL 3,115,354

INSULATED PIPE COUPLING

Filed Dec. 15, 1959

INVENTORS:
Walter J. Bowan,
John J. Smith,
Wilbur R. Leopold, Jr.,
Frank H. Mueller, BY Cushman, Darby & Cushman
ATTORNEYS.

Dec. 24, 1963   W. J. BOWAN ETAL   3,115,354
INSULATED PIPE COUPLING
Filed Dec. 15, 1959                                         2 Sheets-Sheet 2
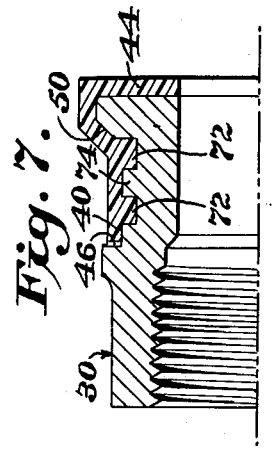
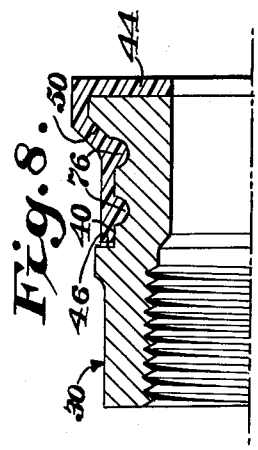
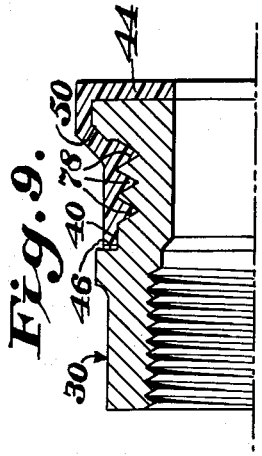
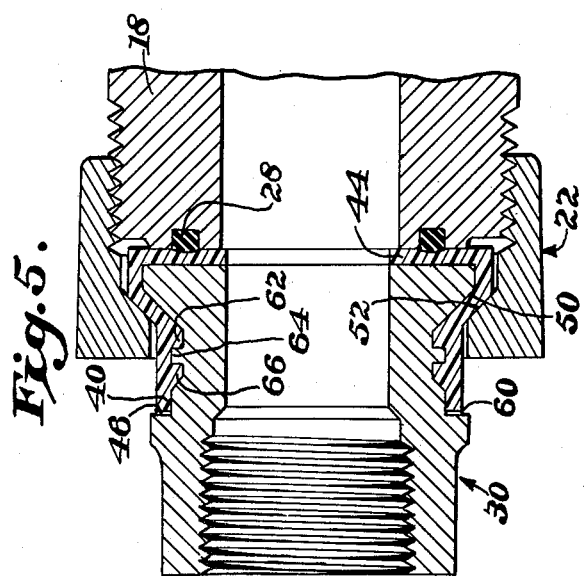
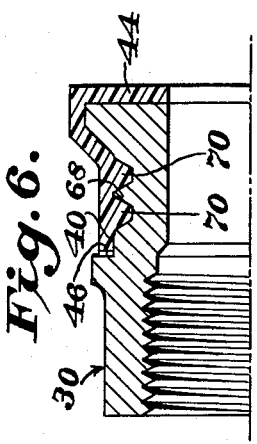
INVENTORS:
Walter J. Bowan,
John J. Smith,
Wilbur R. Leopold, Jr.
BY Frank H. Mueller,
Cushman, Darby & Cushman
ATTORNEYS.

United States Patent Office 3,115,354
Patented Dec. 24, 1963

3,115,354
INSULATED PIPE COUPLING
Walter J. Bowan, John J. Smith, Wilbur R. Leopold, Jr., and Frank H. Mueller, Decatur, Ill., assignors to Mueller Co., Decatur, Ill., a corporation of Illinois
Filed Dec. 15, 1959, Ser. No. 860,303
2 Claims. (Cl. 285—52)

This invention relates to an improved electrically-insulated pipe coupling or union. This application is a continuation-in-part of our copending application Serial No. 786,186, filed January 12, 1959, now abandoned.

Electrically-insulated pipe couplings or unions are known in the art and are used primarily to electrically insulate sections of metal pipe from each other to minimize corrosion caused by electrolytic action. Prior couplings or unions of this nature, however, are subject to numerous disadvantages. First of all, existing insulated unions include numerous loose parts that can easily be lost in the field when the parts are disassembled preparatory to making up a joint. Many existing insulated couplings do not make an effective seal so that leakage sometimes occurs. Furthermore, in numerous existing couplings of this nature the two pipe sections are held together solely by friction, accomplished by compression of a gasket or the like, so that a positive lock of the two pipe sections is not had.

Accordingly, it is an object of the present invention to provide an improved electrically insulated pipe coupling or union which involves a minimum of loose parts, provides effective electrical insulation, provides a most effective seal against the escape of fluids, and in which the two pipe ends or parts are positively locked together.

It is another object of this invention to provide an improved insulated pipe coupling or union that not only possesses the foregoing advantages, but also can be manufactured economically and assembled with ease in the field.

Other objects and advantages of the invention will become apparent from the following description and accompanying drawings, in which:

FIGURE 5 is a view corresponding to FIGURE 2, but illustrating a somewhat modified form of the invention.

FIGURES 6–9 are fragmentary sectional views illustrating further modified forms of one of the coupling parts embodying this invention.

Figure 1:
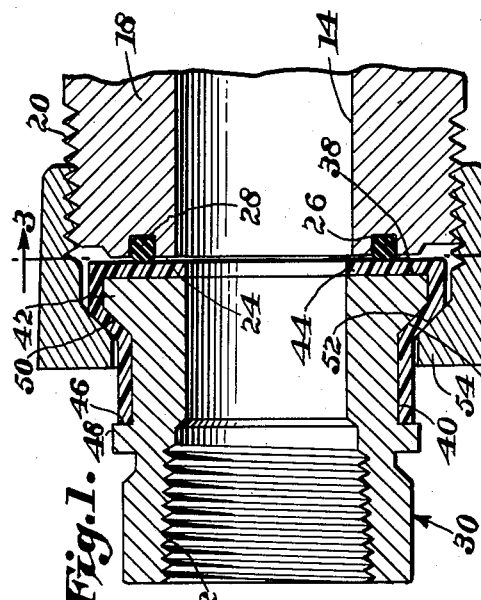
FIGURE 1 is a fragmentary longitudinal sectional view of an improved union embodying this invention, with the joint being shown in a partially made-up condition.

Referring now to the drawings, the invention will be illustrated by means of an electrically-insulated union which connects a rotary plug valve to a pipe, but it will be realized that the invention is applicable to joints between any two hollow or tubular members, such as pipes, fittings, valves, or the like.

Figure 4:
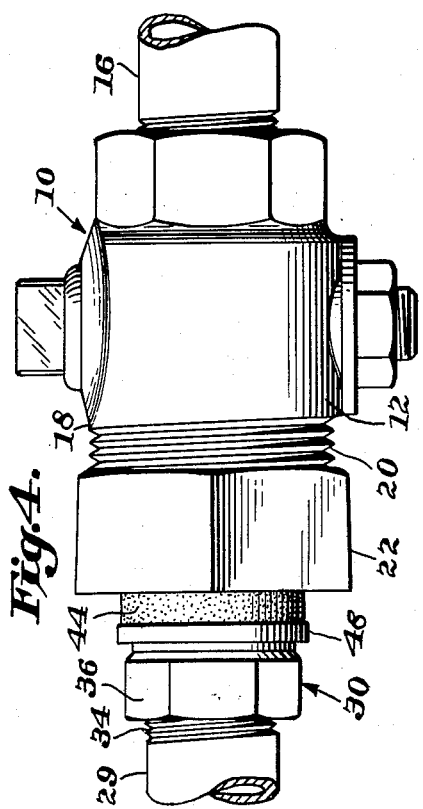
FIGURE 4 is a side elevational view illustrating a rotary plug valve connected to a pipe by means of a union embodying the present invention.
Figure 3:
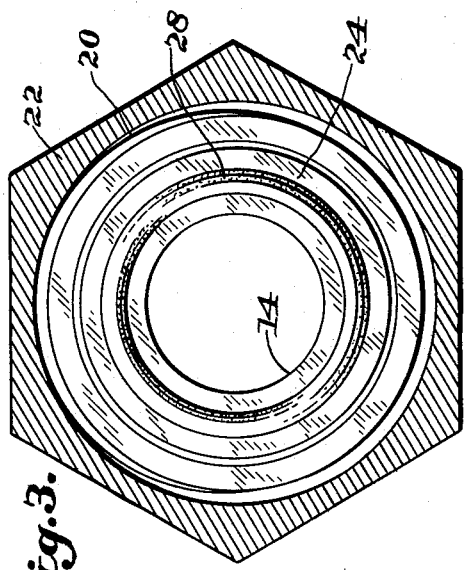
FIGURE 3 is a sectional view taken substantially on the line 3—3 of FIGURE 1.

Referring now to FIGURE 4, there is shown a rotary plug valve 10 having a metal body 12 traversed by a passageway 14 into one end of which is threaded a pipe 16. That portion 18 of the valve body 12 surrounding the other end of the passageway 14 is cylindrical and provided with exterior threads 20 for the reception of a coupling nut 22. The cylindrical portion 18 of the body 12 terminates in a substantially flat annular end surface 24 having an inner edge defined, in this instance, by the passageway 14 and an outer edge that is offset somewhat inwardly from the body threads 20. In other words, the annular end surface 24 on the valve body cylindrical portion 18 is of a lesser radial width than the wall thickness of the body portion.

Recessed into the flat annular end surface 24 is an endless coaxial groove 26, substantially rectangular in radial section, and disposed in this groove is an O-ring 28 of a type well known in the art made of resilient material, such as rubber or the like. The diameter of the O-ring 28, in radial section, is only slightly greater than the depth of the groove 26. The O-ring 28 preferably fits snugly within the groove 26, i.e, in frictional engagement with either the inner or outer side walls of the groove. Hence by reason of its proportion relative to the groove depth, the O-ring 28 is retained firmly in its groove 26 with only a remote possibility of dropping out when it is not held therein by any exterior instrumentality and the valve is moved about or otherwise manipulated prior to assembly of the union, as later described.

In order to attach or connect a pipe 29 to the exteriorly threaded end 18 of the valve body 12, an adaptor or tailpiece 30 preferably is employed. The tailpiece 30 is in the form of a tubular body having interior threads 32 at one end adapted to engage corresponding exterior threads 34 on the end of the pipe 29. The threaded end of the tailpiece 30 also may be provided with a noncircular exterior configuration, as at 36, to facilitate the application of a wrench (not shown) in screwing the tailpiece onto the pipe 29. The other end of the tailpiece 30 is provided with a flat annular end face 38 of greater radial width than the end surface 24 of the valve body 12. The inner diameter of the end face 38 is less than that of the end surface 24 while the outer diameter of the end face is greater than that of the end surface, so that the end face overlaps both the inner and outer edges of the end surface on the cylindrical portion 18 of the valve body.

Somewhat rearwardly of its end face 38 the tailpiece 30 is exteriorly reduced and provided with a section 40 of uniform outer diameter, so that in a sense the tailpiece may be said to be provided with an exterior enlargement 42 on one end. Molded onto the tailpiece 30 and completely covering its end face 38, its enlargement 42, and its section 40 of uniform diameter is a covering 44 of electrically-insulating material that also possesses some gasket qualities. The material 44 preferably is made of a tough plastic such as nylon, Delrin, Lexan, or the like that not only has electrically insulating properties, but also is somewhat deformable by the pressure thereagainst of a metal member so as to effect a tight seal with such member. Nylon is a synthetic linear polyamide while Delrin is a linear polyformaldehyde and Lexan is a polyaromatic carbonate. The exterior section 40 of the tailpiece 30 terminates, at its rearward end, in a forwardly facing shoulder 46 (formed by an exterior circumferential flange 48) which serves both to aid in molding the covering 44 in place and to prevent damage to the rear edge of such covering.

The forward end of the uniform section 40 of the tailpiece 30 terminates in, or rather the rearward face of the exterior enlargement 42 is provided with, a frusto-conical surface 50 having an angular inclination of the order of about 45°. The interior surface 52 of the inwardly extending flange 54 on the coupling nut 22 is inclined to the same angle, so that the interengaged surfaces 52 and 50 on the coupling nut 22 and on the tailpiece 30, or on the electrically-insulating covering 44 on the latter, are complementary. This inclination of these interengaged surfaces, which in the usual coupling nut arrangement are disposed substantially normal to the axis of the nut, as well as the extended area of engagement effected by such inclination, serves both to center the tailpiece 30 properly with respect to the end surface 24 on the cylindrical portion 18 of the valve body 12, and to prevent the nut, i.e., its flange 54, from cutting through the insulating covering 44. Obviously the inner diameter of the nut flange 54 is greater than the diameter of the tailpiece flange 48 so that the nut can be slipped over the former from its threaded end.

Figure 2:
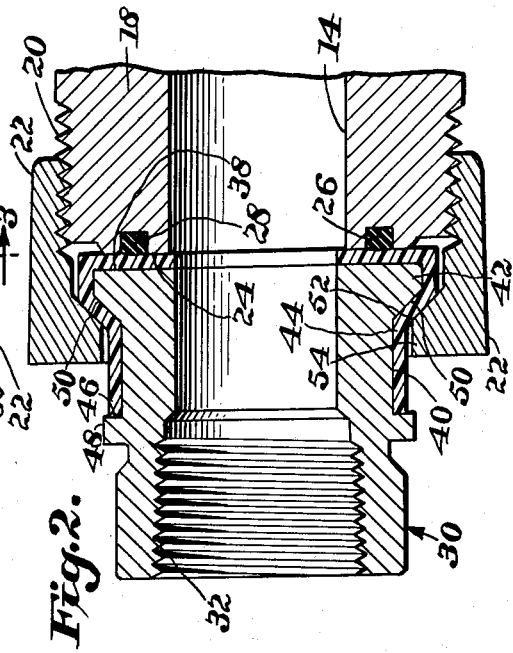
FIGURE 2 is a view corresponding to FIGURE 1 but showing the joint in its completed condition.

When the joint is first made up as illustrated in FIGURE 1, i.e., before the coupling nut 22 is screwed up tight, it will be seen that the O-ring 28 contacts the covering 44 on the end face 38 of the tailpiece 30, before the latter engages the end surface 24 on the cylindrical portion 18 of the valve body 12. As the nut 22 is tightened, however, the covering 44 on the end face 38 of the tailpiece 30 is forced tightly against the end surface 24 on the valve body cylindrical portion 18, thus compressing the O-ring 28 back into its groove 26, as shown in FIGURE 2. The aforedescribed construction not only provides a firm mechanical lock, by reason of the inturned flange 54 on the coupling nut 22 engaging behind the exterior enlargement 42 on the tailpiece 30, but also provides a joint that is fully electrically insulated and tightly sealed against leakage.

As respects the electrical insulating qualities of the joint, it will be seen that the tough nylon covering 44 on the tailpiece 30 is interposed completely between the abutting metal ends 38 and 24 of the tail piece and the valve body so that these two parts cannot make metal-to-metal contact at this point. Furthermore, because the covering 44 is extended rearwardly on the uniform section 40 of the tailpiece 30 for a considerable distance beyond the coupling nut 22, no metal-to-metal contact can occur between the nut and the tailpiece after the joint has been fully made up.

As respects the fluid-pressure-tightness of the joint, first of all the electrically insulating covering 44 is slightly deformed by being pressed tightly against the end surface 24 on the metal valve body 12. This, in itself, constitutes an effective seal. Moreover, it will be seen that the end surface 24 on the valve body is of reduced radial width, and divided, by reason of the O-ring groove 26, into two flat annular surfaces, each of even further reduced radial width. Consequently, these two concentric flat annular surfaces tend to dig into or deform even further the covering 44 on the end face 38 of the tailpiece 30, on tightening the nut 22, to thus increase the effectiveness of the metal-to-plastic seal. The sealing properties of an O-ring are, of course, relatively well-known so that the aforedescribed metal-to-plastic seal is even further augmented by the seal effected by the O-ring 28 being compressed between the bottom of its groove 26 and the opposed plastic covering 44 on the end face 38 of the tailpiece 30. In the event that the plastic material of the covering 44 should creep sufficiently to render the aforedescribed metal-to-plastic seal ineffective, the O-ring 28 will maintain the pressure tightness of the joint.

It also will be seen that by reason of the aforedescribed construction, wherein the O-ring 28 is relatively tightly retained in its groove 26 by frictional engagement, only the coupling nut 22 constitutes a relatively loose piece of the assembly of union parts before a joint is made up. Loss of the coupling nut 22 is not easily accomplished, and loss of the O-ring 28 out of its groove 26 is not apt to occur.

As mentioned above, plastic has a tendency to creep or to cold flow when it is under stress. Consequently, when the joint is made up and the plastic material of the covering 44 is compressed between the interengaged surfaces 52 and 50 on the coupling nut 22 and on the tailpiece 30, the plastic material between these surfaces is under compression and tends to cold flow. Thus, the material will tend to creep in opposite directions from between the aforementioned inclined opposed surfaces 50 and 52. Before the joint is made up the plastic material covering the section 40 of the tailpiece 30 is under tension, i.e., under hoop stress caused by shrinkage of the plastic material on cooling after molding. This shrinkage also tends to pull the plastic material somewhat away from the shoulder 46, as indicated at 60 in FIGURE 5. As the plastic material between the opposed surfaces 50 and 52 tends to creep down toward the material on the section 40, the entire cylindrical section of the plastic material covering the section 40 of the tailpiece 30 tends to move axially toward the shoulder 46. This axial movement can occur because, as mentioned above, there normally exists a gap 60 between the plastic material and the shoulder 46 caused by shrinkage of the plastic after being molded.

In the construction illustrated in FIGURES 1 and 2, the aforementioned axial movement of the plastic on the section 40 of the tailpiece can readily take place because such movement is restrained only by friction between the plastic material and the smooth cylindrical surface of the tailpiece section 40. This movement of the plastic material relieves the compression stresses in the plastic material disposed between the opposed surfaces 50 and 52, and thus reduces the torque required to loosen the coupling nut 22. In other words, the coupling nut 22 loosens somewhat as the plastic tends to creep after the joint has been made up for a considerable period of time. While, as mentioned above, the O-ring 28 will maintain a seal between the two parts of the joint even though the coupling nut 22 is loosened somewhat, any loosening of the coupling nut obviously is undesirable because it interferes with the mechanical strength of the joint. Moreover, any reduction in the torque required to loosen the coupling nut results in a joint wherein vibration, shocks, jars, or the like, may tend to eventually loosen the nut sufficiently so that leakage can occur in spite of the O-ring 28.

Most of the aforementioned difficulty occasioned by creep of the plastic material can be avoided by the modified constructions illustrated in FIGURES 5–9. Essentially, these constructions provide the generally cylindrical section 40 of the tailpiece 30 with a surface that is sufficiently rough to prevent axial movement of the cylindrical section of plastic material molded thereon. The roughening of the surface of this section can be accomplished in various ways, such as by knurling or the like. Preferably, however, the surface of the section 40 of the tailpiece is roughened by providing such section with two or more circumferential grooves separated by ribs.

Thus, for example, as shown in FIGURE 5, the inclined surface 50 of the enlargement 42 merges with a side wall of a groove 62 in the generally cylindrical section 40 of the tailpiece 30. The other side wall of the groove 62 is flat and defines a side of a circumferential rib 64, the opposite side of which is also flat and defines a side wall of another circumferential groove 66 which may have an inclined opposite wall. In this construction, it will be seen that on creepage of compressively stressed plastic material from between the inclined surfaces 50 and 52 toward the section 40 of the tailpiece the rib 64, and particularly the flat annular side thereof resists any rearward axial movement of the plastic material covering the section 40 of the tailpiece. Because the creep of the plastic is thus counteracted, at least in large part, a higher compressive stress remains in the plastic material between the opposed inclined surfaces 50 and 52. This higher compressive stress in the plastic puts more of a reacting load upon the coupling nut 22 so that higher torques are required to loosen the latter.

In FIGURE 6 of the drawing there is shown a further modification wherein the side walls of a rib 68 separating two grooves 70 in the cylindrical section 40 of the tailpiece 30 converge and meet to define a sharp edge. In the modification illustrated in FIGURE 7, all of the side walls of two grooves 72 and of a separating rib 74 in the cylindrical section 40 of the tailpiece 30 are substantially flat, i.e., disposed at 90° to the axis of the tailpiece.

In the modification illustrated in FIGURE 8, two spaced grooves 76 may be of semicircular or rounded configuration in radial section. The modification illustrated in FIGURE 9, is similar to that illustrated in FIGURE 6, save that more than two grooves 78 are provided in the cylindrical section 40 of the tailpiece 30 and the inclined side walls of such grooves meet at their bottoms.

All of the modifications shown in FIGURES 5-9 provide the desired result of greatly inhibiting any axial movement of the annular section of plastic material covering the generally cylindrical section 40 of the tailpiece 30. The modification illustrated in FIGURE 5 is preferred, however, not only because it has been found that the flat side wall of the rib 64 which faces the surface 50 is more effective in preventing undesirable axial movement of the plastic material, but also because the machining of the configuration of this modification in the tailpiece 30 is more easily accomplished. It also has been found that the modifications shown in FIGURES 5 to 9 inhibit the possibility of leakage between the tailpiece 30 and its plastic covering 44.

It thus will be seen that the objects of this invention have been fully and effectively accomplished. It will be realized, however, that the foregoing specific embodiments have been shown and described only for the purpose of illustrating the principles of this invention and is subject to extensive change without departure from such principles. Therefore, this invention includes all modifications encompassed within the spirit and scope of the following claims.

We claim:

1. An insulated pipe coupling comprising: a hollow metal body terminating in a cylindrical portion having an annular end face pierced by a central passageway, said end face being provided with a flat annular surface; an annular groove in said surface generally rectangular in radial section and surrounding said passageway; a tubular metal body terminating at one end in a flat annular end face opposed to said flat annular surface on said hollow body; an exterior enlargement on said tubular body on its said one end, the rear face of said enlargement being inclined rearwardly and merging with a generally-cylindrical section of said body having at least one circumferential groove adjacent the junction of said rear face with said section, said groove defining a shoulder on said cylindrical body section adjacent and facing said rear face; a tough electrically-insulating relatively-thin covering of gasket material having cold flow characteristics molded onto said tubular body end face, onto said enlargement, onto said body section, and filling said circumferential groove, the outer surface of said covering on said body section and in said groove defining a cylinder of substantially constant diameter; a coupling nut having a flange provided with a surface portion complementary to and engaged with a major portion of said covering on said inclined rear face of said enlargement and threaded onto said cylindrical portion of said hollow body to force said end face thereof into sealing engagement with said covering on said tubular body end face, the entire axial force thus developed being exerted through said covering and tending to cause cold flow thereof; and an O-ring in said annular groove, the diameter of said ring in radial section being slightly greater than the depth of said groove so that said ring is partially compressed between said groove bottom and said covering to effect a seal, whereby said shoulder acts as a dam to prevent cold flow of said covering along said rear face toward said cylindrical section of said body and thereby inhibits loosening of said coupling.

2. The structure defined in claim 1 in which the body section is provided with another circumferential groove spaced from the first-mentioned circumferential groove and defining therebetween a circumferential rib covered with said gasket material.

References Cited in the file of this patent

UNITED STATES PATENTS

| | | |
|---|---|---|
| 410,293 | Rockwell | Sept. 3, 1889 |
| 764,603 | Lambert | July 12, 1904 |
| 882,416 | Pitner | Mar. 17, 1908 |
| 939,434 | McVoy | Nov. 9, 1909 |
| 969,492 | Peeples | Sept. 6, 1910 |
| 2,574,191 | Platzer | Nov. 6, 1951 |
| 2,752,479 | Caldwell | June 25, 1956 |
| 2,785,911 | Kaufman | Mar. 19, 1957 |

FOREIGN PATENTS

| | | |
|---|---|---|
| 101,278 | Australia | June 24, 1937 |
| 103,968 | Australia | May 13, 1938 |
| 549,947 | Canada | Dec. 10, 1957 |